(12) United States Patent
Shi et al.

(10) Patent No.: US 11,759,891 B2
(45) Date of Patent: Sep. 19, 2023

(54) METHOD FOR DEPOSITING HORIZONTAL RIB ON UNEQUAL-HEIGHT SECTION BY LASER CLADDING

(71) Applicant: Soochow University, Jiangsu (CN)

(72) Inventors: Tuo Shi, Jiangsu (CN); Dongsheng Li, Jiangsu (CN); Gang Li, Jiangsu (CN); Weiwei Jiang, Jiangsu (CN); Hao Su, Jiangsu (CN)

(73) Assignee: SOOCHOW UNIVERSITY, Suzhou (CN)

( * ) Notice: Subject to any disclaimer, the term of this patent is extended or adjusted under 35 U.S.C. 154(b) by 624 days.

(21) Appl. No.: 16/708,765

(22) Filed: Dec. 10, 2019

(65) Prior Publication Data

US 2020/0180079 A1     Jun. 11, 2020

(30) Foreign Application Priority Data

Dec. 11, 2018   (CN) .......................... 201811508472.2

(51) Int. Cl.
*B23K 26/342*     (2014.01)
*B33Y 10/00*      (2015.01)

(52) U.S. Cl.
CPC ............ *B23K 26/342* (2015.10); *B33Y 10/00* (2014.12)

(58) Field of Classification Search
None
See application file for complete search history.

(56) References Cited

U.S. PATENT DOCUMENTS

2005/0040147 A1* 2/2005 Hoebel .............. B23K 26/0006
                                                  219/121.64
2021/0220948 A1* 7/2021 Sekiguchi ............ B23K 26/144

FOREIGN PATENT DOCUMENTS

CN           106216678 A   * 12/2016

* cited by examiner

*Primary Examiner* — Ibrahime A Abraham
*Assistant Examiner* — Elizabeth M Kerr

(57) ABSTRACT

The present invention relates to a method for depositing a horizontal rib on an unequal-height section by laser cladding, including the following steps: providing an unequal-height section and a laser cladding device, determining a deposition position on the unequal-height section, and determining a length of a rib on the unequal-height section according to the deposition position; using a lowest point of the deposition position as a first segment of the rib and a highest point as a last segment of the rib; determining a number of segments of the rib according to the length and a vertical height of each segment of the rib; determining a cladding speed of each segment of the rib according to a relationship between a cladding height of each segment of the rib and a scanning speed under a certain parameter, and carrying out laser cladding to obtain a horizontal rib.

4 Claims, 2 Drawing Sheets

METHOD FOR DEPOSITING HORIZONTAL RIB ON UNEQUAL-HEIGHT SECTION BY LASER CLADDING

TECHNICAL FIELD

The present invention relates to a method for depositing a horizontal rib on an unequal-height section by laser cladding, and belongs to the technical field of laser cladding forming.

BACKGROUND

Laser cladding forming technology is a new technology developed by combining laser cladding technology and rapid prototyping technology. It is to slice a formed part to a certain thickness, convert a three-dimensional design model into a series of two-dimensional contour information, and use a laser cladding method to deposit a material layer by layer according to the trajectory of the contour to finally form a three-dimensional solid part. In the prior art, rib processing on unequal-height sections often uses machining, welding, and casting, etc. However, machining consumes time and materials, resulting in serious waste; while welding has deformations or insufficient strength, and casting has a long cycle and requires subsequent processing.

Based on the above, the present invention provides a method for depositing a horizontal rib on an unequal-height section by laser cladding.

SUMMARY

An objective of the present invention is to provide a method for depositing a horizontal rib on an unequal-height section by laser cladding. The method adopts a scanning speed changing segment by segment to divide the rib on the unequal-height section into segments, and utilizes the effect of the scanning speed change on the height of a clad layer to obtain a horizontal rib by cladding.

To achieve the above objective, the present invention provides the following technical solution. A method for depositing a horizontal rib on an unequal-height section by laser cladding, including the following steps:

providing an unequal-height section and a laser cladding device, determining a deposition position on the unequal-height section, and determining a length of a rib on the unequal-height section according to the deposition position; and using a lowest point of the deposition position as a first segment of the rib and a highest point as a last segment of the rib; determining a number of segments of the rib according to the length and a vertical height of each segment of the rib: determining a cladding speed of each segment of the rib according to a relationship between a cladding height of each segment of the rib and a scanning speed under a certain parameter: and carrying out laser cladding to obtain a horizontal rib.

Further, the first segment and the last segment are provided with a deceleration segment.

Further, the deceleration segment has a projected length of 1 mm on a horizontal surface.

Further, a height difference between adjacent segments of the rib is less than or equal to 0.5 mm.

Further, the unequal-height section includes an inclined surface.

Further, the first segment and the last segment are both on the inclined surface; an included angle between the inclined surface and the horizontal surface is defined as $\alpha$, and a length of the rib on the inclined surface is L; the height difference between adjacent segments of the rib is less than or equal to 0.5 mm; the number of the segments is $n \geq 2[2+2(L-2/\cos \alpha)\sin \alpha]$, that is, the number n of the segments is an integer greater than or equal to $2+2(L-2/\cos \alpha)\sin \alpha$.

Further, the unequal-height section includes a plane surface connecting the inclined surface, and the plane surface is at a highest point of the inclined surface.

Further, the first segment is on the inclined surface, and the last segment is on the plane surface; an included angle between the inclined surface and the horizontal surface is defined as a, and a length of the rib on the inclined surface is L; the height difference of the adjacent segments of the rib is less than or equal to 0.5 mm; the number of the segments is $n \geq [3+2(L-1/\cos \alpha)\sin \alpha]$, that is, the number n of the segments is an integer greater than or equal to $3+2(L-1/\cos \alpha)\sin \alpha$.

Further, a cladding speed of the laser cladding is 2-8 mm/s.

Further, the relationship between the height of each segment of the rib and the cladding speed is $h=1.222-0.104v$, where h is the height of each segment of the rib and v is the cladding speed. Compared with the prior art, the present invention has the following beneficial effects. In the present invention, the method for depositing a horizontal rib on an unequal-height section by laser cladding adopts a scanning speed changing segment by segment to divide the rib on the unequal-height section into segments. The method utilizes the effect of the scanning speed change on the height of a clad layer to directly achieve the cladding forming of the horizontal rib on the unequal-height section. The method has high deposition rate and material utilization rate, and does not require subsequent processing. In addition, the method for depositing a horizontal rib on an unequal-height section by laser cladding also prevents the collapse of the two ends of the rib by decelerating in the first and the last segments. In this way, the method ensures that the obtained rib has a firm structure and high parallelism.

The above description is merely an overview of the technical solution of the present invention. To make the technical means of the present invention more comprehensible and implemented in accordance with the content of the specification, the present invention is described in detail below with reference to the preferred embodiments of the present invention and accompanying drawings.

DETAILED DESCRIPTION

The specific implementations of the present invention are described in more detail below with reference to the accompanying drawings and embodiments. The following embodiments are intended to illustrate the present invention, rather than to limit the scope of the present invention.

Figure 1:
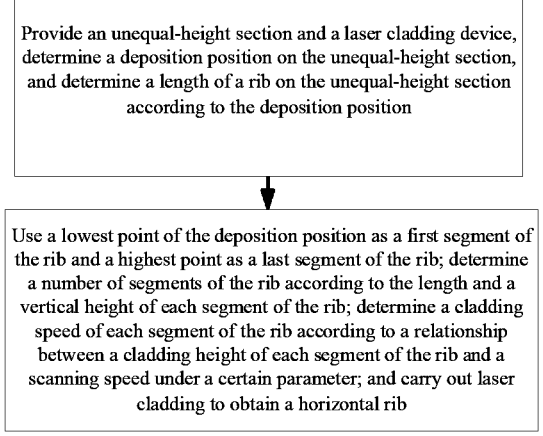
FIG. 1 is a step diagram of a method for depositing a horizontal rib on an unequal-height section by laser cladding according to the present invention.

Referring to FIG. 1, the present invention provides a method for depositing a horizontal rib on an unequal-height section by laser cladding, including the following steps:

provide an unequal-height section and a laser cladding device, determine a deposition position on the unequal-height section. and determine a length of a rib on the unequal-height section according to the deposition position; and use a lowest point of the deposition position as a first segment of the rib and a highest point as a last segment of the rib; determine the number of segments of the rib according to the length and a vertical height of each segment of the rib, the height difference between adjacent segments of the rib being less than or equal to 0.5 mm; determine a cladding speed of each segment of the rib according to a relationship between a cladding height of each segment of the rib and a scanning speed under a certain parameter; and carry out laser cladding to obtain a horizontal rib.

In the present invention, since the laser needs to be turned on and off in the first segment and the last segment of the rib, the first and the last segments will have a problem of collapse. Therefore, it is necessary to set a deceleration segment in the first and the last segments to prevent collapse. Preferably, the deceleration segment has a projected length of 1 mm on a horizontal surface. Of course, the collapse problem can also be solved by setting a laser stop time for the first and the last segments.

In the present invention, the unequal-height section may be only an inclined surface, or may be an inclined surface connected to a plane surface. After the deposition position is determined on the unequal-height section, the lowest point of the deposition position is used as the first segment (generally the lowest point of the inclined surface) for cladding the rib. The highest point of the deposition position is used as the last segment for cladding the rib. When the unequal-height section includes an inclined surface connecting a plane surface and the plane surface is at a highest point of the inclined surface, a segment of the rib cladded on the plane surface is the last segment. If a lowest point of the inclined surface is used as the last segment, laser interference will occur due to a laser-off position on the inclined surface. As a result, the last segment cannot grow vertically, but being cladded into a smooth curve shape.

When the number of the segments is determined according to the length of the rib, in principle, each segment should have a small change of a laser beam spot, so as to ensure that wide parts of each segment of the rib are as equal as possible. Specifically, an included angle between the inclined surface and the horizontal surface is defined as a, and a length of the rib on the inclined surface is L; the height difference of the adjacent segments of the rib is less than or equal to 0.5 mm, that is, the length of each segment of the rib is less than or equal to 0.5 sin $\alpha$. When the first segment and the last segment are both on the inclined surface, the number of the segments is n≥[2+2(L−2/cos $\alpha$)sin $\alpha$], that is, the number n of the segments is an integer greater than or equal to 2+2(L−2/cos $\alpha$)sin $\alpha$, including the deceleration segment in the first and the last segments. When the first segment is on the inclined surface and the last segment is on the plane surface, a segment of the rib on the plane surface is the last segment (a plane segment). In this case, the number of the segments is n≥[3+2(L−1/cos $\alpha$)sin $\alpha$], that is, the number n of the segments is an integer greater than or equal to 3+2(L−1/cos $\alpha$)sin $\alpha$, including the deceleration segment in the first and the last segments.

When the cladding speed of each segment of the rib is determined, as the laser cladding speed has an effect on the cladding height, a more powder melted per unit time indicates a higher clad layer; otherwise, the clad layer is lower. Therefore, the cladding speed is set to be higher at a lower point of the inclined surface and lower at a higher point of the inclined surface. As a number of clad layers increases, the lower point of the inclined surface will be basically horizontal with the higher point of the inclined surface. Specifically, when the cladding speed changes within the range of 2-8 mm/s, the cladding height and the cladding speed approximate a linear relationship, which is used to determine the speed of each segment. The relationship between the cladding height and the cladding speed is obtained by a linear regression of measured data from a single-track cladding experiment, that is, h=1.222−0.104 v. In this formula, h is the height of each segment of the rib, and v is the cladding speed. However, the deceleration segment does not satisfy this relationship.

The present invention is described in more detail below with reference to the specific embodiments.

Embodiment 1

Figure 2:
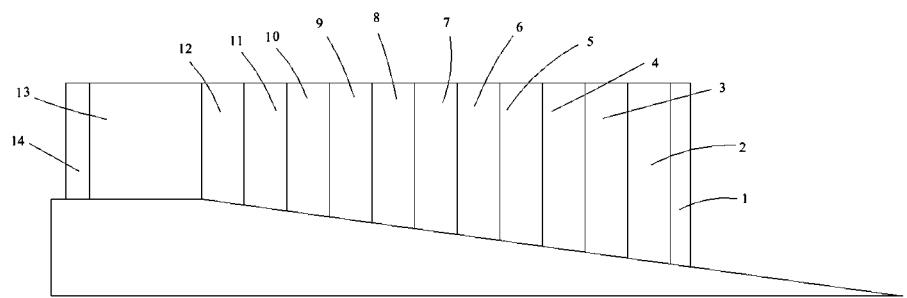
FIG. 2 is a diagram showing a cladding result of depositing a horizontal rib on an unequal-height section by laser cladding according to Embodiment 1 of the present invention.

Referring to FIG. 2, in this embodiment, a deposition position of a rib includes a plane surface and an inclined surface. Specifically, the rib has a total length of 34.4 mm, including a length of 10 mm on the plane surface and a length of 24.4 mm on the inclined surface. The inclined surface is 25 mm long and has a projected length of 5.37 mm in a vertical direction. A number of segments of the rib is determined according to the above data. A height difference between adjacent segments of the rib needs to be less than or equal to 0.5 mm. sin $\alpha$=5.37/25=0.2148 and cos $\alpha$=0.9767. According to these equations, a number of segments of the rib in this embodiment is n≥[3+2×(24.4−1/0.9767)×0.2148]=14. In this embodiment, n=14. A segment 2 is a first segment, and a segment 13 is a last segment (a plane segment). Segments 1 and 14 are deceleration segments in the first and the last segments, respectively. The deceleration segments have a length of 1 mm. A cladding height of each segment of the rib is determined according to an actual need, and a cladding speed of each segment of the rib is determined according to a relationship between the cladding height and the cladding speed, that is, h=1.222−0.104 v, specifically as shown in Table 1.

TABLE 1

| Segment No. | Cladding speed v (mm/s) | Cladding height h (mm) |
| --- | --- | --- |
| 1 | 2-2.2 | 0.85-0.88 |
| 2 | 3-3.2 | 0.9-1 |
| 3 | 3.5-3.6 | 0.854-0.867 |
| 4 | 3.9-4 | 0.8-0.88 |
| 5 | 4.5-4.6 | 0.76-0.752 |
| 6 | 5-5.2 | 0.695-0.71 |
| 7 | 5.5-5.6 | 0.63-0.65 |
| 8 | 5.9-6 | 0.598-0.6 |
| 9 | 6.5-6.6 | 0.53-0.54 |
| 10 | 7-7.1 | 0.472-0.485 |
| 11 | 7.4-7.5 | 0.44-0.453 |
| 12 | 8-8.2 | 0.37-0.39 |
| 13 | 8-8.1 | 0.38-0.387 |
| 14 | 5.4-5.6 | 0.384-0.39 |

Finally, the cladding speed of each segment of the rib is set on a laser cladding device, and laser cladding is carried out to obtain a horizontal rib deposited on an unequal-height section.

Embodiment 2

Figure 3:
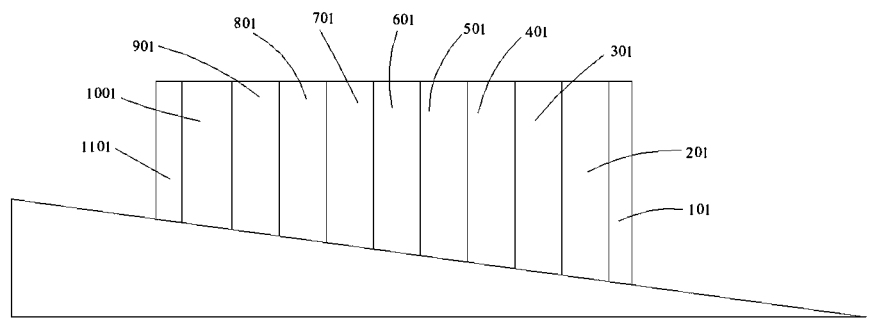
FIG. 3 is a diagram showing a cladding result of depositing a horizontal rib on an unequal-height section by laser cladding according to Embodiment 2 of the present invention.

Referring to FIG. 3, in this embodiment, a deposition position of a rib is only located on an inclined surface.

In this embodiment, the horizontal rib is only deposited on the inclined surface by laser cladding. Specifically: an included angle between the inclined surface and a horizontal line is 9°, and a length of the deposition position is determined to be 30 mm, which is also the length of the rib. A number of segments of the rib is determined according to the above data. A height difference between adjacent segments of the rib needs to be less than or equal to 0.5 mm. According to the above equations, the number of the segments of the rib in this embodiment is n≥[2+2×(30−2/cos 9°)sin 9°]≥11. In this embodiment, n=11. A segment 201 is a first segment, and a segment 1001 is a last segment. Segments 101 and 1101 are deceleration segments in the first segment and the last segment, respectively. The deceleration segments have a length of 1 mm. A cladding height of each segment of the rib is determined according to an actual need, and a cladding speed of each segment of the rib is determined according to a relationship between the cladding height and the cladding speed, that is, h=1.222−0.104 v, specifically as shown in Table 2.

TABLE 2

| Segment No. | Cladding speed v (mm/s) | Cladding height h (mm) |
| --- | --- | --- |
| 101 | 2.1-2.4 | 0.7-0.87 |
| 201 | 2.9-3 | 0.9-0.93 |
| 301 | 3.5-3.6 | 0.846-0.854 |
| 401 | 4-4.1 | 0.79-0.8 |
| 501 | 4.5-4.6 | 0.747-0.752 |
| 601 | 4.9-5 | 0.71-0.724 |
| 701 | 5.5-5.6 | 0.643-0.65 |
| 801 | 6.5-6.6 | 0.53-0.54 |
| 901 | 7.4-7.5 | 0.44-0.48 |
| 1001 | 8-8.1 | 0.38-0.39 |
| 1101 | 5.6-6.3 | 0.254-0.326 |

Finally, the cladding speed of each segment of the rib is set on a laser cladding device, and laser cladding is carried out to obtain a horizontal rib deposited on an unequal-height section.

To sum up, in the present invention, the method for depositing a horizontal rib on an unequal-height section by laser cladding adopts a scanning speed changing segment by segment to divide the rib on the unequal-height section into segments. The method utilizes the effect of the scanning speed change on the height of a clad layer to directly achieve the cladding forming of the horizontal rib on the unequal-height section. The method has high deposition rate and material utilization rate, and does not require subsequent processing. In addition, the method for depositing a horizontal rib on an unequal-height section by laser cladding also prevents the collapse of the two ends of the rib by decelerating in the first and the last segments. In this way, the method ensures that the obtained rib has a firm structure and high parallelism.

The technical features of the above embodiments may be arbitrarily combined. For brevity of description, all possible combinations of the technical features in the above embodiments are not described. However, as long as there is no contradiction between the combinations of these technical features, all these combinations should be considered as the scope of this specification.

The above embodiments are merely illustrative of several implementations of the present invention, and the description thereof is more specific and detailed. However, these embodiments may not to be construed as a limitation to the patentable scope of the present invention. It should be pointed out that several variations and improvements may be made by those of ordinary skill in the art without departing from the conception of the present invention, but such variations and improvements should fall within the protection scope of the present invention. Therefore, the protection scope of the patent of the present invention should be subject to the appended claims.

What is claimed is:

1. A method for depositing a horizontal rib on an unequal-height section by laser cladding, comprising the following steps:
    providing an unequal-height section and a laser cladding device, determining a deposition position on the unequal-height section, and determining a length of a rib on the unequal-height section according to the deposition position, wherein the unequal-height section comprises an inclined surface;
    using a lowest point of the deposition as a first segment of the rib and a highest point as a last segment of the rib due to a laser-off position on the inclined surface;
    determining a number of segments of the rib according to the length and a vertical height of each segment of the rib;
    determining a scanning speed of each segment of the rib according to a relationship between a cladding height of each segment of the rib and a scanning speed under a certain parameter; and
    carrying out laser cladding to obtain a horizontal rib;
    wherein the first segment and the last segment are provided with a deceleration segment that is deposited with the scanning speed less than the scanning speed of the adjacent segment in the length of the rib;
    wherein a scanning speed of the laser cladding is 2-8 mm/s; and
    wherein the relationship between the cladding height of each segment of the rib and the scanning speed is h=1.222−0.104 v, wherein the h is the cladding height in mm of each segment of the rib and the v is the scanning speed in mm/s.

2. The method for depositing a horizontal rib on an unequal-height section by laser cladding according to claim 1, wherein the deceleration segment has a projected length of 1 mm on a horizontal surface.

3. The method for depositing a horizontal rib on an unequal-height section by laser cladding according to claim 1, wherein a height difference between adjacent segments of the rib is less than or equal to 0.5 mm.

4. The method for depositing a horizontal rib on an unequal-height section by laser cladding according to claim 1, wherein the unequal-height section comprises a plane surface connected to the inclined surface, and the plane surface is at a highest point of the inclined surface.

* * * * *